United States Patent
Min et al.

(10) Patent No.: US 9,007,382 B2
(45) Date of Patent: Apr. 14, 2015

(54) SYSTEM AND METHOD OF RENDERING 3D GRAPHICS

(75) Inventors: Kyoung June Min, Yongin-si (KR);
Chan Min Park, Seongnam-si (KR);
Won Jong Lee, Suwon-si (KR);
Dong-Hoon Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 849 days.

(21) Appl. No.: 12/458,670

(22) Filed: Jul. 20, 2009

(65) Prior Publication Data
US 2010/0164949 A1  Jul. 1, 2010

(30) Foreign Application Priority Data
Dec. 29, 2008 (KR) .................. 10-2008-0135491

(51) Int. Cl.
*G06F 13/14* (2006.01)
*G06T 15/00* (2011.01)

(52) U.S. Cl.
CPC .................................... *G06T 15/005* (2013.01)

(58) Field of Classification Search
CPC ............................ G06T 1/20; G06T 2210/52
USPC .......... 345/502–503, 537–539, 419, 520, 505
See application file for complete search history.

(56) References Cited

U.S. PATENT DOCUMENTS

| | | | |
|---|---|---|---|
| 5,262,965 A * | 11/1993 | Putnam et al. ................. | 358/1.1 |
| 5,966,534 A | 10/1999 | Cooke et al. | |
| 5,970,254 A | 10/1999 | Cooke et al. | |
| 6,380,935 B1 * | 4/2002 | Heeschen et al. ............. | 345/423 |
| 6,556,200 B1 * | 4/2003 | Pfister et al. ................... | 345/426 |
| 6,697,063 B1 * | 2/2004 | Zhu ................................ | 345/421 |
| 7,075,541 B2 * | 7/2006 | Diard ............................. | 345/505 |
| 7,414,623 B2 * | 8/2008 | Whitted et al. ............... | 345/420 |
| 7,634,622 B1 * | 12/2009 | Musoll et al. ................. | 711/151 |
| 8,261,042 B2 * | 9/2012 | Kanstein et al. ............... | 712/15 |
| 2002/0002573 A1 | 1/2002 | Landers et al. | |
| 2002/0085010 A1 * | 7/2002 | McCormack et al. ........ | 345/545 |
| 2002/0118202 A1 * | 8/2002 | Baldwin ........................ | 345/530 |
| 2002/0126124 A1 * | 9/2002 | Baldwin et al. .............. | 345/533 |
| 2002/0130886 A1 * | 9/2002 | Baldwin ........................ | 345/611 |
| 2002/0171652 A1 * | 11/2002 | Perego .......................... | 345/542 |
| 2003/0142101 A1 * | 7/2003 | Lavelle et al. ................ | 345/537 |

(Continued)

FOREIGN PATENT DOCUMENTS

KR  10-2008-0064607  7/2008
WO     03/025784 A2   3/2003

OTHER PUBLICATIONS

Francisco-Javier Veredas et al., "Custom implementation of the coarse-grained reconfigurable ADRES architecture for multimedia purposes," Field Programmable Logic and Applications, 2005. International Conference on, vol., No., pp. 106-111, Aug. 24-26, 2005.*

(Continued)

*Primary Examiner* — Maurice L McDowell, Jr.
(74) *Attorney, Agent, or Firm* — NSIP Law

(57) ABSTRACT

A system and method of rendering three-dimensional (3D) graphics. The system for rendering 3D graphics may include a plurality of cores including a scratch pad memory, a first memory to perform a control flow, a second memory for loop acceleration, and a shared memory to interpolate with the plurality of cores.

15 Claims, 8 Drawing Sheets

(56) References Cited

U.S. PATENT DOCUMENTS

| | | | |
|---|---|---|---|
| 2003/0164840 A1* | 9/2003 | O'Driscoll | 345/611 |
| 2004/0130552 A1* | 7/2004 | Duluk et al. | 345/506 |
| 2006/0095716 A1* | 5/2006 | Ramesh | 712/24 |
| 2006/0143415 A1* | 6/2006 | Naik | 711/163 |
| 2006/0209078 A1* | 9/2006 | Anderson et al. | 345/506 |
| 2007/0150711 A1* | 6/2007 | Kim et al. | 712/228 |
| 2008/0005473 A1* | 1/2008 | Chen et al. | 711/118 |
| 2008/0079744 A1* | 4/2008 | Xu et al. | 345/552 |
| 2008/0084423 A1* | 4/2008 | Bakalash et al. | 345/505 |
| 2008/0114937 A1* | 5/2008 | Reid et al. | 711/117 |
| 2008/0259076 A1* | 10/2008 | Meinds | 345/423 |
| 2009/0070552 A1* | 3/2009 | Kanstein et al. | 712/29 |
| 2009/0150654 A1* | 6/2009 | Oberman et al. | 712/221 |
| 2009/0174706 A1* | 7/2009 | Howson | 345/419 |
| 2011/0102437 A1* | 5/2011 | Akenine-Moller et al. | 345/426 |
| 2011/0148901 A1* | 6/2011 | Adams et al. | 345/589 |
| 2011/0164038 A1* | 7/2011 | Jung et al. | 345/420 |
| 2011/0216069 A1* | 9/2011 | Keall et al. | 345/441 |
| 2013/0120380 A1* | 5/2013 | Kallio et al. | 345/421 |
| 2013/0335429 A1* | 12/2013 | Barringer et al. | 345/506 |

OTHER PUBLICATIONS

Owens, J.D.; Houston, M.; Luebke, D.; Green, S.; Stone, J.E.; Phillips, J.C., "GPU Computing," Proceedings of the IEEE, vol. 96, No. 5, pp. 879,899, May 2008.*

Gao, J.; Huang, J.; Han-Wei Shen; Kohl, J.A., "Visibility culling using plenoptic opacity functions for large volume visualization," Visualization, 2003. VIS 2003. IEEE, vol., No., pp. 341,348, Oct. 24-24, 2003.*

* cited by examiner

SYSTEM AND METHOD OF RENDERING 3D GRAPHICS

CROSS-REFERENCE TO RELATED APPLICATIONS

This application claims the benefit of Korean Patent Application No. 10-2008-0135491, filed on Dec. 29, 2008, in the Korean Intellectual Property Office, the disclosure of which is incorporated herein by reference.

BACKGROUND

1. Field

One or more embodiments relate to a system and method of rendering three-dimensional (3D) graphics using a multi-core processor, and more particularly, to a 3D graphics rendering technology which may split a task and prevent data from being redundantly processed using a multi-core processor, and thereby may efficiently use the multi-core processor.

2. Description of the Related Art

In a tile-based three-dimensional (3D) rendering method, a screen may be divided into a plurality of tiles, and rendering may be performed with respect to tiles, including at least a portion of a triangle, from among the plurality of tiles. In this instance, rendering with respect to a single tile may be performed using a frame memory embedded in a chip. When rendering with respect to the single tile is completed, the tile may be simultaneously transmitted to a location of a tile of an external frame buffer using a burst mode.

When a single core or the same number of cores as the number of tiles is used for rendering, an optimum result may not be obtained in terms of cost or efficiency of processing.

Accordingly, a system and method of rendering 3D graphics using a multi-core processor which may improve performance and resource utilization, and reduce costs is required.

SUMMARY

One or more embodiments may provide a system for rendering three-dimensional (3D) graphics, the system including a plurality of cores including a scratch pad memory, a first memory to perform a control flow, a second memory for loop acceleration, and a shared memory to interpolate with the plurality of cores.

Each of the plurality of cores may be configured as a dual core as a basic unit and include at least one dual core.

Each of the plurality of cores may include a reconfigurable processor core, and the first memory may include an instruction memory performing the control flow, and the second memory may include a configuration memory for the loop acceleration.

The reconfigurable processor core may include a plurality Arithmetic Logic Units (ALUs), and all or a portion of the plurality of ALUs may be operated depending on at least one predetermined mode.

The at least one predetermined mode may include a Very Long Instruction Word (VLIW) mode to perform the control flow, and a Coarse Grained Array (CGA) mode for the loop acceleration. The shared memory and the scratch pad memory may be used in the VLIW mode, and the scratch pad memory may be used in the CGA mode.

According to one or more embodiments, there may be provided a method of tile-based rendering of 3D graphics, the method including distributing data into a plurality of cores, and processing the distributed data using any one of a plurality of predetermined modes.

The plurality of cores may include at least one dual core, and the distributing may divide a triangle into a top portion and a bottom portion and distribute the data into the at least one dual core.

The processing may perform at least one of vertex shading, span processing, and texture mapping in the CGA mode, and perform at least one of sorting, testing, interpolation, determinant calculation, and division in the VLIW mode.

The processing may include double-buffering data of a tile-based frame buffer using a shared memory in interoperation with the plurality of cores, and sequentially processing the data of the tile-based frame buffer.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
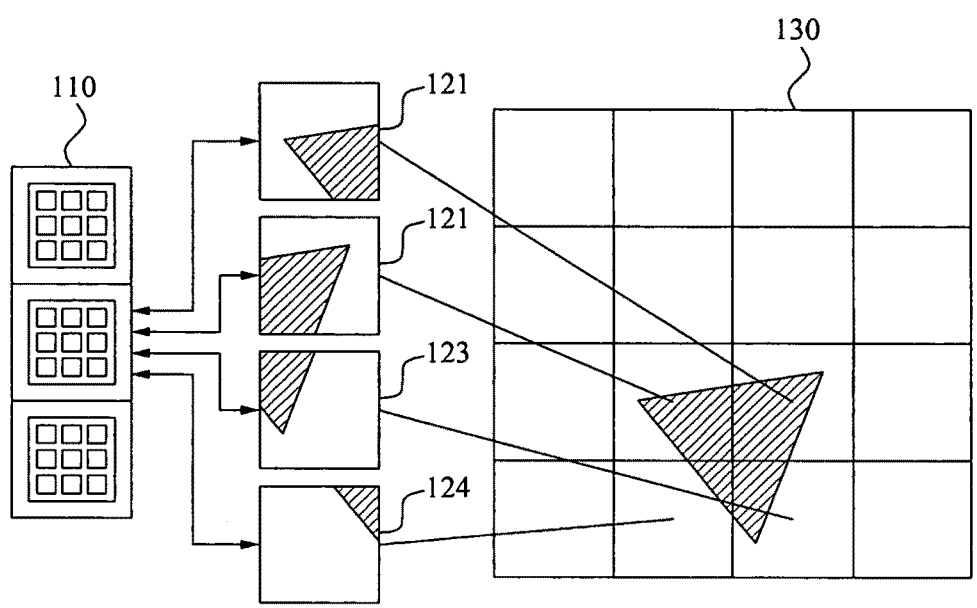
FIG. 1 illustrates an operation of three-dimensional (3D) graphics rendering using a multi-core processor according to one or more embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates an operation of three-dimensional (3D) graphics rendering using a multi-core processor 110 according to one or more embodiments.

Referring to FIG. 1, in a tile-based rendering using the multi-core processor 110, a screen 130 may be divided into a plurality of tiles, and rendering may be performed with respect to tiles 121, 122, 123, and 124 where a triangle to be rendered is included. That is, rendering may be performed with respect to the divided tiles 121, 122, 123, and 124 using the multi-core processor 110. Accordingly, an efficiency of the processing may be improved. In this instance, a processing speed may be relatively slow when rendering using a single core processor, and a cost may be relatively high or a resource utilization may be relatively inferior when rendering using a same number of cores as a number of tiles.

Accordingly, data may be divided and processed using an appropriate number of multi-core processors. Also, scheduling may prevent data from being redundantly processed.

Figure 2:
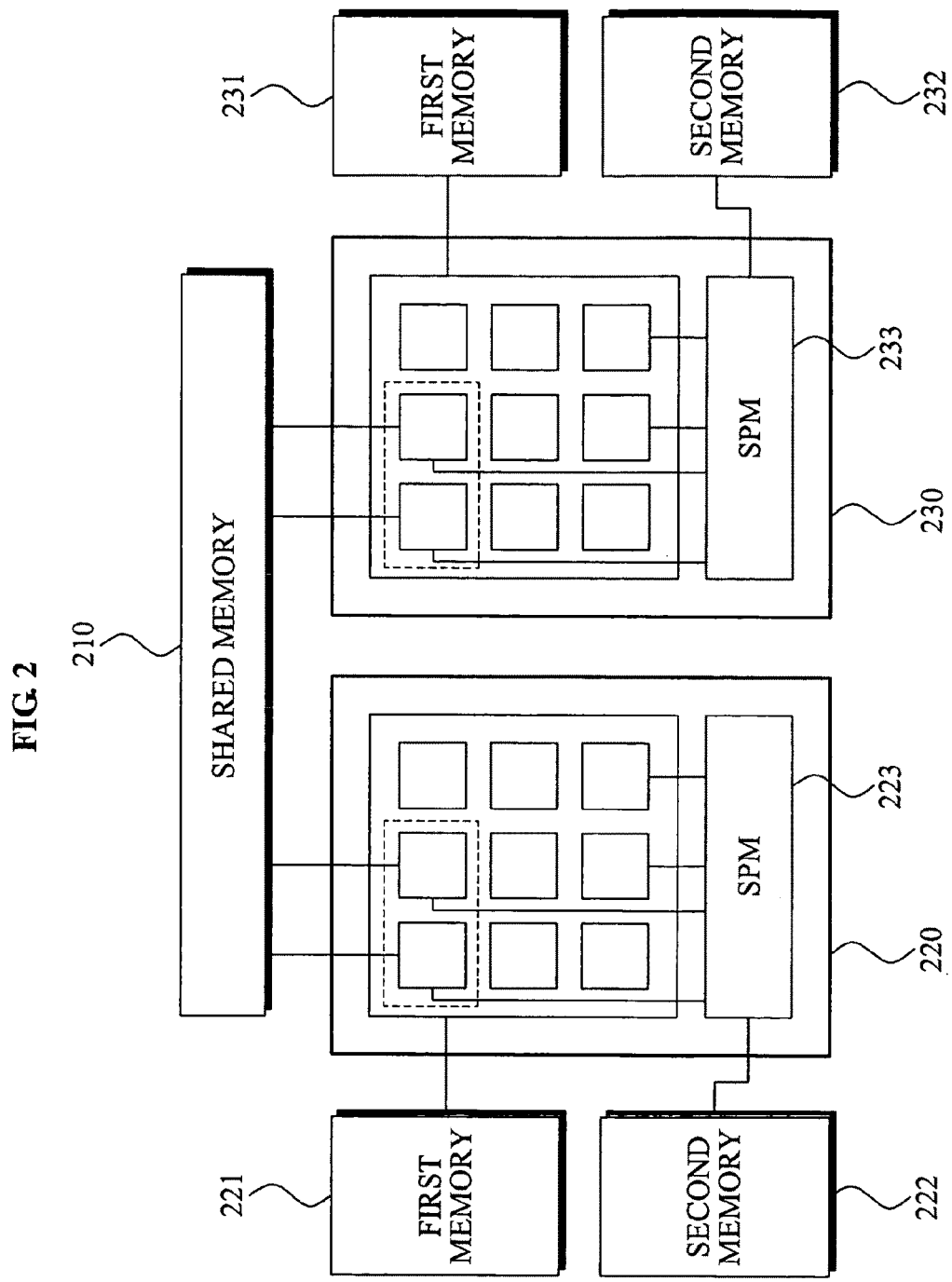
FIG. 2 illustrates a configuration of a system for rendering 3D graphics according to one or more embodiments.

FIG. 2 illustrates a configuration of a system for rendering 3D graphics according to one or more embodiments.

Referring to FIG. 2, the system for rendering 3D graphics using a multi-core processor may include a plurality of cores 220 and 230, first memories 221 and 231, second memories 222 and 232, and a shared memory 210.

The plurality of cores 220 and 230 may include scratch pad memories (SPMs) 223 and 233, respectively. For example, the plurality of cores 220 and 230 may be a reconfigurable processor (RP) core. Here, the RP core may include a plurality of Arithmetic Logic Units (ALUs), and all or a portion of the plurality of ALUs may be operated depending on at least one predetermined mode.

For example, the at least one predetermined mode may include a Very Long Instruction Word (VLIW) mode to perform the control flow, and a Coarse Grained Array (CGA) mode for the loop acceleration. A portion of the plurality of ALUs of the RP core may be operated in the VLIW mode, and all of the plurality of ALUs of the RP core may be operated in the CGA mode. For example, at least one of vertex shading, span processing, and texture mapping may be performed in the CGA mode, and at least one of sorting, testing, interpolation, determinant calculation, and division may be performed in the VLIW mode.

Also, the shared memory 210 and the SPMs 223 and 233 may be used in the VLIW mode, and the SPMs 223 and 233 may be used in the CGA mode.

As illustrated in FIG. 2, each of the plurality of cores 220 and 230 may be configured as a dual core, or be a set of cores having a dual core as a basic unit. In this instance, the number of the plurality of cores 220 and 230 may vary for an optimum performance.

The first memories 221 and 231 may be a memory for performing a control flow. For example, the number of first memories 221 and 231 may be the same as the number of cores. That is, a single first memory may exist for a single core. Also, the first memories 221 and 231 may be an instruction memory. Accordingly, an instruction used in the VLIW mode may be stored in the instruction memory to perform the control flow.

The second memories 222 and 232 may be a memory for loop acceleration. Similarly to the first memories 221 and 231, a number of second memories 222 and 232 may be the same as the number of cores. Accordingly, a single core may exist for a single second memory. Also, for example, the second memories 222 and 232 may be a configuration memory. Accordingly, a configuration used in the CGA mode may be stored in the configuration memory for the loop acceleration.

Data, required for calculation of each of the plurality of cores 220 and 230, may be pre-fetched and stored in the shared memory 210 to prevent the data from being redundantly processed. Also, double-buffering may be performed with respect to data of a tile-based frame buffer through the shared memory 210, and the data of the tile-based frame buffer may be sequentially processed. Accordingly, successive calculation may be guaranteed and a performance may be improved.

Figure 3:
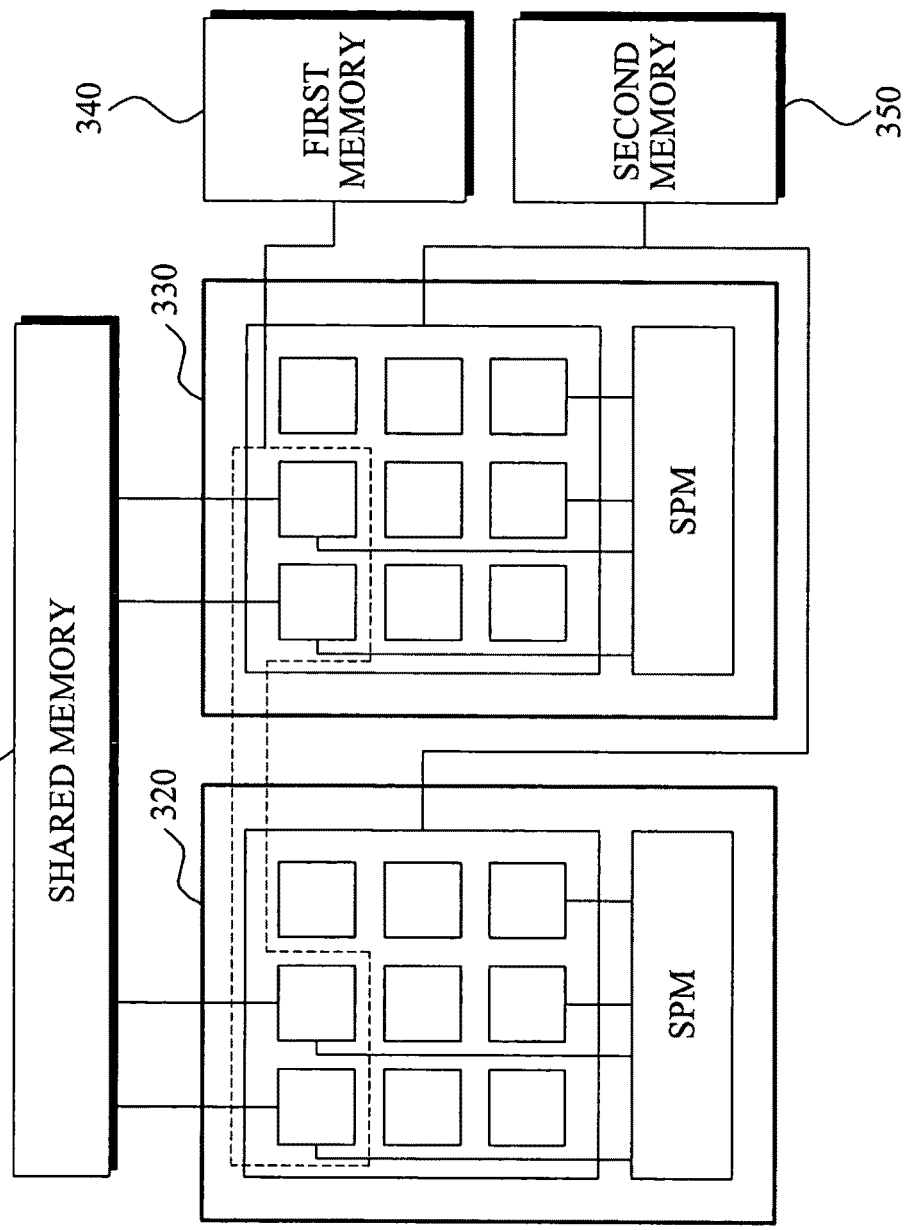
FIG. 3 illustrates a configuration of a system for rendering 3D graphics according to one or more embodiments.

FIG. 3 illustrates a configuration of a system for rendering 3D graphics according to one or more embodiments.

Referring to FIG. 3, the system for rendering 3D graphics using a multi-core processor may include a plurality of cores 320 and 330, a first memory 340, and a second memory 350, and a shared memory 310.

That is, a first memory and a second memory may not exist for each core, and the single first memory 340 and the single second memory 350 may be included in the system for rendering 3D graphics. In this case, the single first memory 340 and the single second memory 350 may be connected to each of the plurality of cores 320 and 330, respectively, for processing data.

Figure 4:
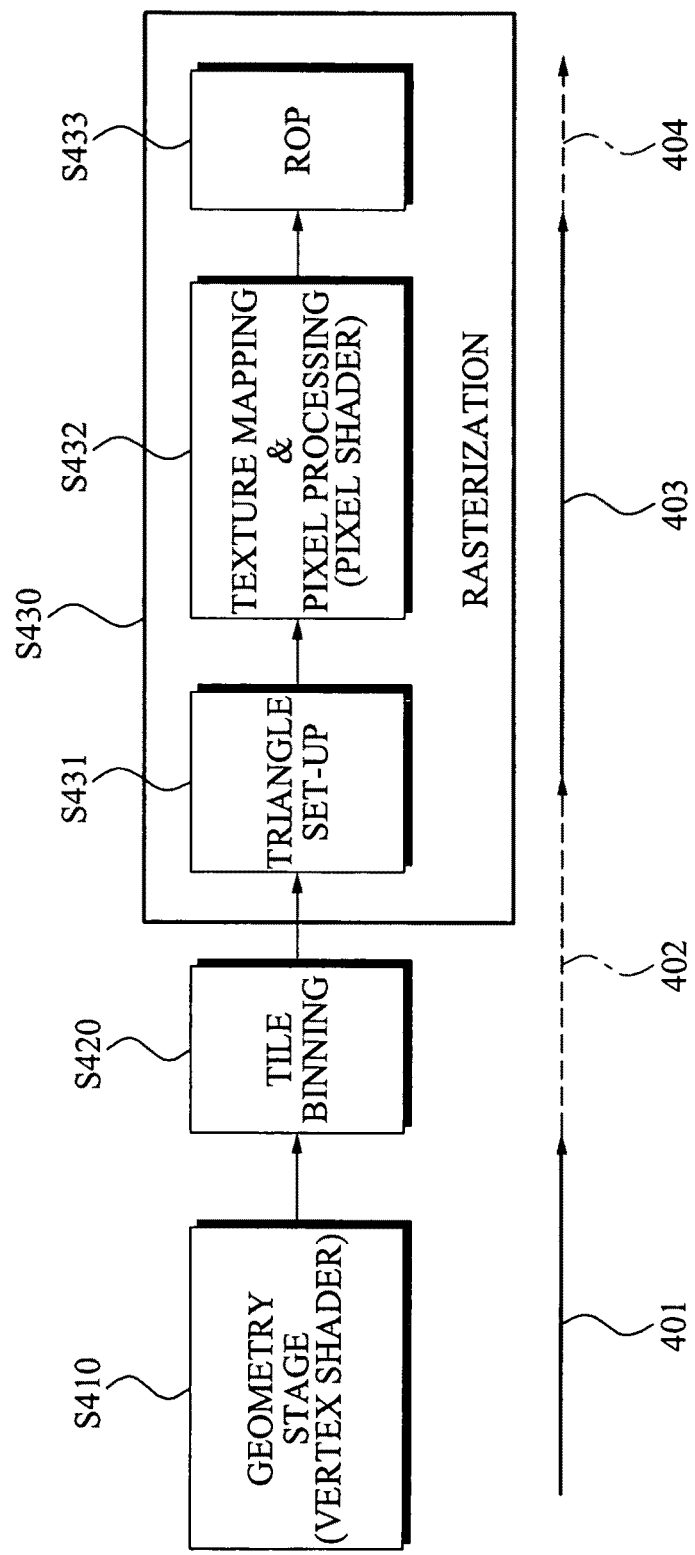
FIG. 4 illustrates a 3D graphics rendering pipeline in terms of functional characteristics according to one or more embodiments.

FIG. 4 illustrates a 3D graphics rendering pipeline in terms of functional characteristics according to one or more embodiments.

Referring to FIG. 4, in operation S410, a color, coordinates, a value, etc. associated with a vertex may be processed.

In operation S420, it may be determined which tile in a screen a triangle is included in.

In operation S430, a 3D model, which is converted into two-dimensional (2D) coordinates and represented in a vector form, may be generated as a pixel-based 2D screen. Specifically, in operation S431, a triangle which is a basic unit for representing the 3D model may be set up.

In operation S432, texture mapping and pixel processing may be performed.

In operation S433, graphics to be newly made and previously made graphics may be combined in a raster operation (ROP).

In this instance, each processing in operations S410, S420, and S430 including S431, S432, and S433 may be performed in a predetermined mode for each characteristic. For example, when a plurality of cores may be used as an RP core, processing for a control flow, etc. may be performed in a VLIW mode, and processing for loop acceleration, and the like may be performed in a CGA mode. Accordingly, each processing may be performed in a VLIW mode 402 and 404 (shown with dashed lines), or a CGA mode 401 and 403 (shown with solid lines), as illustrated in FIG. 4.

Figure 5:
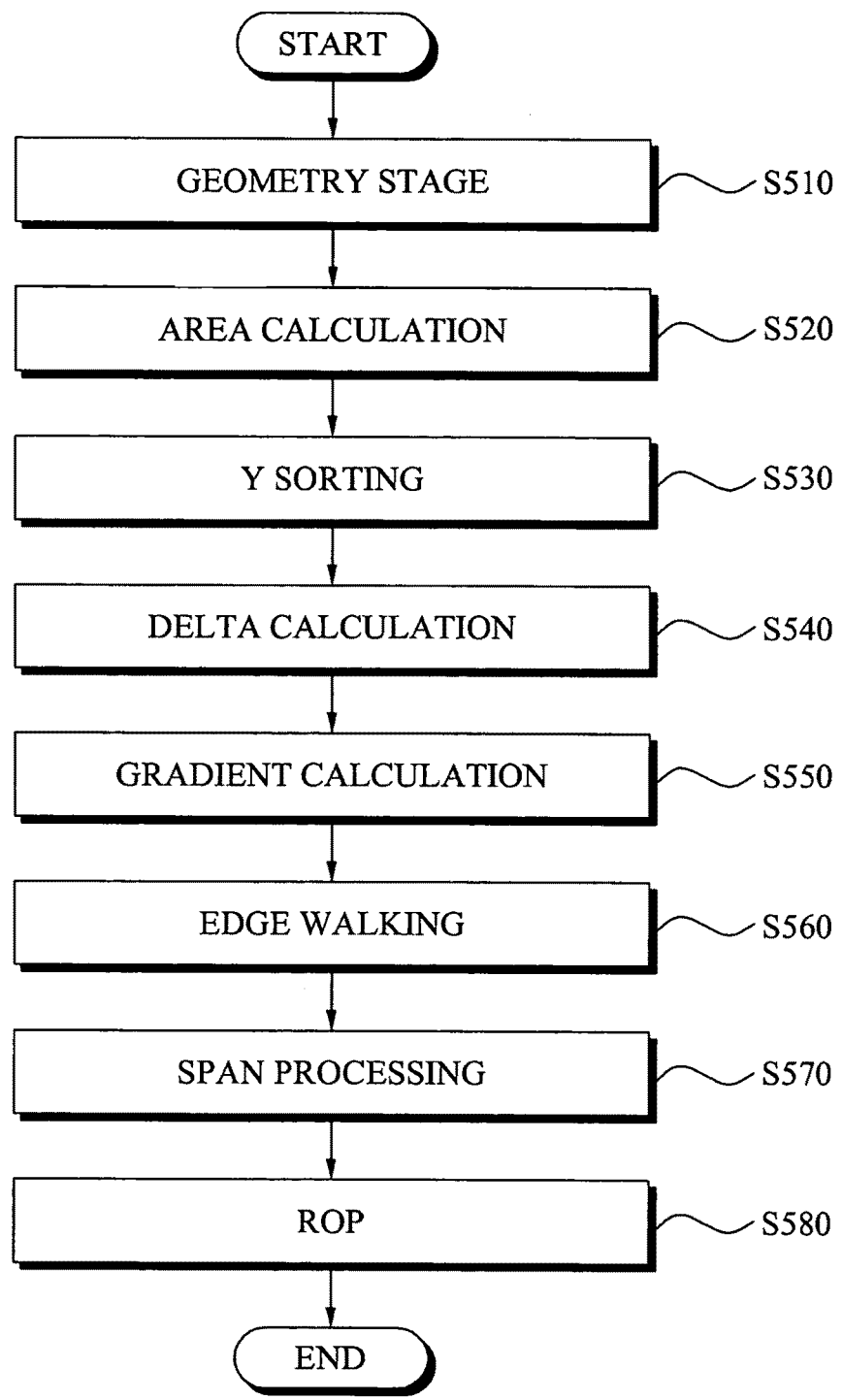
FIG. 5 illustrates a flowchart of a method of a pipeline of a 3D graphics rendering pipeline, for example, the 3D graphics rendering pipeline of FIG. 4, in detail.

FIG. 5 illustrates a flowchart of a method of a pipeline of a 3D graphics rendering pipeline, for example, the 3D graphics rendering pipeline of FIG. 4, in detail.

Referring to FIG. 5, processing associated with a vertex may be performed in operation S510. An area of a triangle may be calculated in operation S520.

Y-sorting may be performed to divide the triangle in operation S530. An increment value of a z value may be obtained through delta calculation in operation S540. Color change may be processed by gradient calculation in operation S550.

Edge walking may be performed in operation S560. Span processing may be performed in operation S570. Graphics to be newly made and previously made graphics may be combined through a raster operation (ROP) in operation S580.

For example, when a plurality of cores may be used as an RP core, processing in operations S510 through S580 may be performed in a VLIW mode or a CGA mode depending on characteristics of all of the processing. Accordingly, the area calculation in operation S520, the Y-sorting in operation S530, the delta calculation in operation S540, the gradient calculation in operation S550, the edge walking in operation S560, and the ROP in operation S580 may be performed in the VLIW mode. Also, the geometry stage in operation S510 and the span processing in operation S570 may be performed in the CGA mode.

As described above, each operation may be performed in a predetermined mode depending on the characteristics of all of the processing, and data may be divided and processed by a plurality of processors. Accordingly, an efficiency of a total of the processing may be improved.

Figure 6:
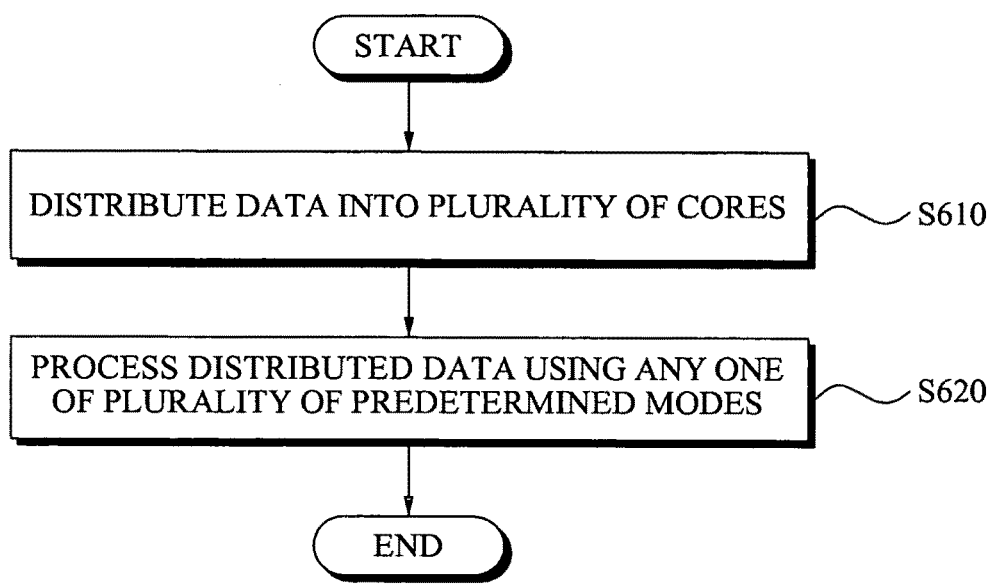
FIG. 6 illustrates a flowchart of a method of rendering 3D graphics according to one or more embodiments.

FIG. 6 illustrates a flowchart of a method of rendering 3D graphics according to one or more embodiments.

Referring to FIG. 6, in operation S610, data may be distributed into a plurality of cores. Here, any one of vertex data for processing a vertex and triangle data for dividing and processing a triangle may be distributed.

In operation S620, the distributed data may be processed using any one of a plurality of predetermined modes. For example, when an RP core is used, a control flow may be performed in a VLIW mode, and loop acceleration may be performed in a CGA mode.

Also, for example, when a 3D graphics rendering is performed using a dual core processor, in operation S610, the triangle may be divided into a top portion and a bottom portion and processed by each of the core processors. In this instance, data processed in each of the core processors in operation S620 may be prevented from being redundantly processed, and thus consistency of data may be maintained when multi-core processing.

Figure 7:
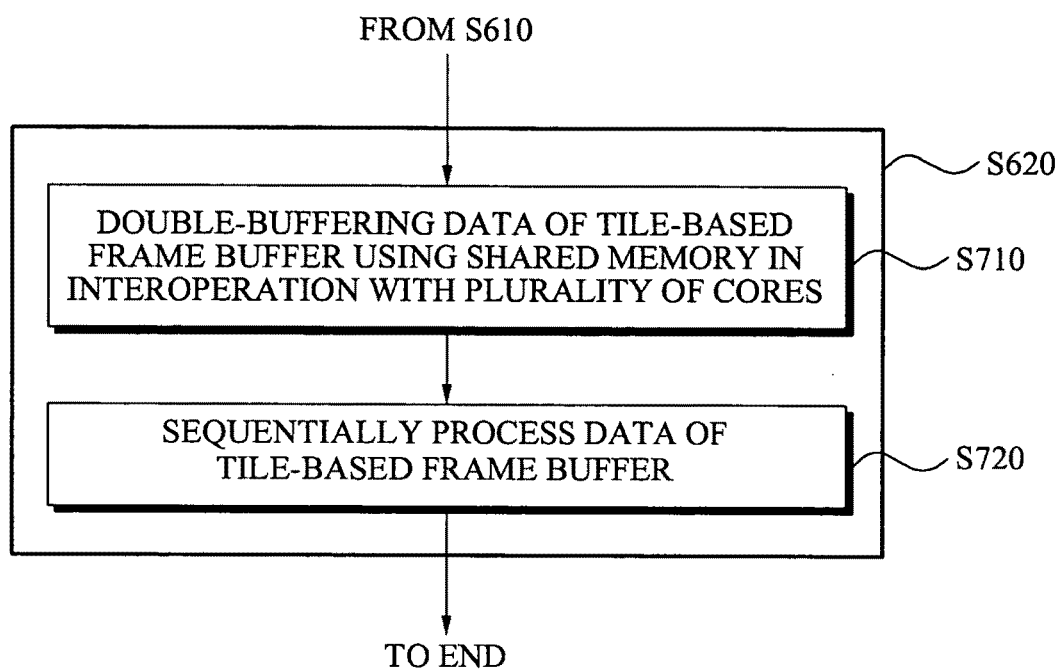
FIG. 7 illustrates a flowchart of an operation of processing data using double-buffering in a method of rendering 3D graphics, for example, the method of rendering 3D graphics of FIG. 6.

FIG. 7 illustrates a flowchart of an operation of processing data using double-buffering in the method of rendering 3D graphics, for example, the operations performed in S620 of FIG. 6.

Referring to FIG. 7, in operation S710, data of a tile-based frame buffer may be double-buffered using a shared memory in interoperation with the plurality of cores. In operation S720, the data of the tile-based frame buffer may be sequentially processed.

Accordingly, data to be subsequently processed may be pre-fetched, and thus successive calculation may be guaranteed and performance may be maximized.

Figure 8:
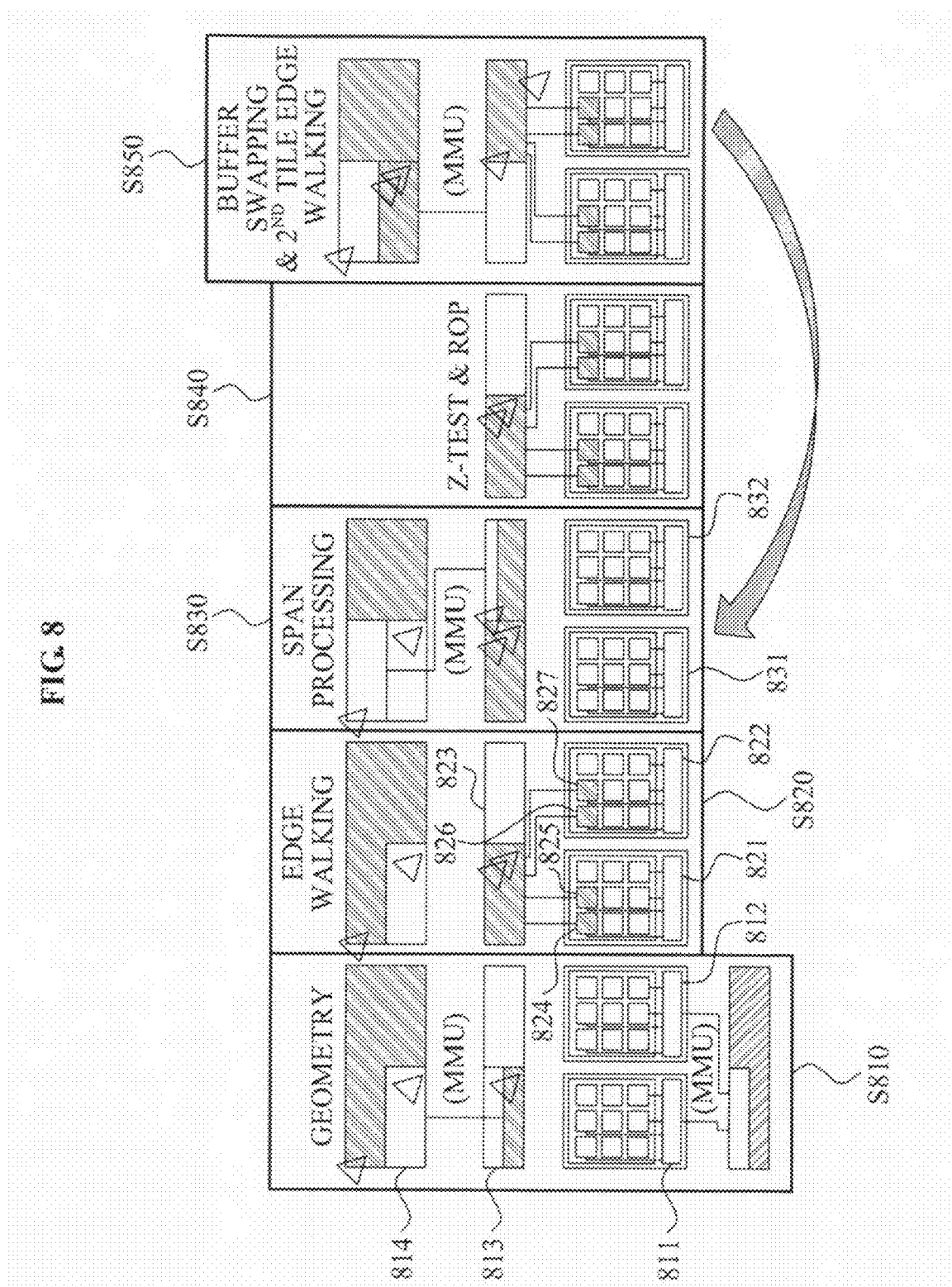
FIG. 8 illustrates an operation of 3D graphics rendering using a multi-core processor according to one or more embodiments.

FIG. 8 illustrates an operation of 3D graphics rendering using a multi-core processor according to one or more embodiments.

Referring to FIG. 8, in a geometry stage S810, vertex data may be transmitted to each of SPMs 811 and 812 by a Memory Management Unit (MMU), and be processed in a CGA mode using software pipelining.

Also, when tile binning is completed, a tile-based frame buffer 814 may be copied to a shared memory 813 by the MMU.

In operation S820, edge walking may be performed. Specifically, when processing of vertex data of a vertex shader is completed, an outcome of the CGA mode may move to a shared memory 823 through VLIW units 824, 825, 826, and 827 without overhead. Here, the outcome of the CGA mode may be recorded in SPMs 821 and 822.

Subsequently, the triangle may be set up in a VLIW mode using a Single Instruction Multiple Data (SIMD) method and control flow. Also, edge information of the triangle, divided into a top portion and a bottom portion in Y-sorting operation, may be moved to the SPMs 821 and 822.

In operation S830, span processing may be performed. Since the top portion and the bottom portion of the triangle may not be overlapped, a fragment value of the triangle may be calculated in the CGA mode through two cores 831 and 832. In this instance, a fragment shader code without texture mapping and control flow may be performed.

In operation S840, ROP may be performed. Specifically, testing such as a z-test may be performed, and a Red, Green, Blue, Alpha (RGBA) value may be simultaneously calculated using an SIMD method in the VLIW mode where a control flow may be processed.

In operation S850, a tile-based frame buffer may be updated using an MMU. At the same time, span processing with respect to a double-buffered subsequent tile may be repeated.

As described above, a task may be efficiently split and processed using a multi-core processor, and data may be prevented from being redundantly processed. Accordingly, a system and method of tile-based rendering 3D graphics with improved performance and resource utilization may be provided.

Also, a mode based on functional characteristics of each rendering process may be used when a core is operated, and thus a system and method of tile-based rendering 3D graphics may improve an efficiency of processing.

In addition to the above described embodiments, embodiments can also be implemented through computer readable code/instructions in/on a medium, e.g., a computer readable medium, to control at least one processing device to implement any above described embodiment. The medium can correspond to any medium/media permitting the storing and/or transmission of the computer readable code. Examples of code/instructions may include machine code, produced by a compiler, and files containing higher level code that may be executed by the computer using an interpreter.

The computer readable code can be recorded on a medium in a variety of ways, with examples of recording media including magnetic storage media (e.g., ROM, floppy disks, hard disks, etc.) and optical recording media (e.g., CD-ROMs, or DVDs). The computer readable code may also be transferred through transmission media as well as elements of the Internet, for example. Thus, the medium may be such a defined and measurable structure carrying or controlling a signal or information, such as a device carrying a bitstream, for example, according to one or more embodiments. The media may also be a distributed network, so that the computer readable code is stored/transferred and executed in a distributed fashion. Still further, as only an example, the processing device could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A system for rendering three-dimensional (3D) graphics, the system comprising:
   a plurality of cores including a scratch pad memory and each selectively performing one of a control flow and loop acceleration based on functional characteristics of each rendering process;
   a first memory to perform a control flow;
   a second memory for loop acceleration; and
   a shared memory to interoperate with the plurality of cores, wherein data required for calculation of each of the plurality of cores is pre-fetched and stored in the shared memory.

2. The system of claim 1, wherein each of the plurality of cores is configured as a dual core as a basic unit and includes at least one dual core.

3. The system of claim 1, wherein each of the plurality of cores includes a reconfigurable processor core, and the first memory includes an instruction memory performing the control flow, and the second memory includes a configuration memory for the loop acceleration.

4. The system of claim 3, wherein the reconfigurable processor core includes a plurality Arithmetic Logic Units (ALUs), and all or a portion of the plurality of ALUs is operated depending on at least one predetermined mode.

5. The system of claim 4, wherein the at least one predetermined mode comprises:
a Very Long Instruction Word (VLIW) mode to perform the control flow; and
a Coarse Grained Array (CGA) mode for the loop acceleration,
wherein the shared memory and the scratch pad memory are used in the VLIW mode, and the scratch pad memory is used in the CGA mode.

6. The system of claim 1, wherein each of the first memory and the second memory corresponds to each of the plurality of cores.

7. A method of tile-based rendering of 3D graphics, the method comprising:
distributing data into a plurality of cores to selectively perform one of a control flow and loop acceleration; and
processing the distributed data using any one of a plurality of predetermined modes based on functional characteristics of each rendering process,
wherein data required for calculation of each of the plurality of cores is pre-fetched and stored in a shared memory.

8. The method of claim 7, wherein the distributing distributes any one of vertex data and triangle data into the plurality of cores.

9. The method of claim 7, wherein the plurality of cores includes at least one dual core, and the distributing divides a triangle into a top portion and a bottom portion and distributes the data into the at least one dual core.

10. The method of claim 7, wherein the plurality of modes comprises:
a Very Long Instruction Word (VLIW) mode to perform control flow; and
a Coarse Grained Array (CGA) mode for loop acceleration.

11. The method of claim 10, wherein the processing performs at least one of vertex shading, span processing, and texture mapping in the CGA mode, and performs at least one of sorting, testing, interpolation, determinant calculation, and division in the VLIW mode.

12. The method of claim 10, wherein the shared memory and a scratch pad memory are used in the VLIW mode, and the scratch pad memory is used in the CGA mode.

13. The method of claim 10, wherein a portion of ALUs of each of the plurality of cores is used in the VLIW mode, and all the ALUs of each of the plurality of cores is used in the CGA mode.

14. The method of claim 7, wherein the processing comprises:
double-buffering data of a tile-based frame buffer using the shared memory in interoperation with the plurality of cores; and
sequentially processing the data of the tile-based frame buffer.

15. At least one computer readable recording medium controlling at least one processing device to implement a method of tile-based rendering of 3D graphics, the method comprising:
distributing data into a plurality of cores to selectively perform one of a control flow and loop acceleration; and
processing the distributed data using any one of a plurality of predetermined modes based on functional characteristics of each rendering process,
wherein data required for calculation of each of the plurality of cores is pre-fetched and stored in a shared memory.

* * * * *